United States Patent [19]

Croket

[11] Patent Number: 4,714,557
[45] Date of Patent: Dec. 22, 1987

[54] PRESSURE FILTER CAKE-BREAKING METHOD AND APPARATUS

[75] Inventor: Francis M. Croket, Farmington Hills, Mich.

[73] Assignee: AMSTED Industries Incorporated, Chicago, Ill.

[21] Appl. No.: 873,361

[22] Filed: Jun. 12, 1986

[51] Int. Cl.$^4$ .................. B01D 29/14; B01D 29/38
[52] U.S. Cl. ............................. 210/769; 100/211; 209/381; 210/355; 210/356; 210/413; 210/416.1; 210/455; 210/485; 210/791; 210/808
[58] Field of Search ............... 100/122, 126, 130, 211, 100/298.37, 112; 209/379, 380, 381; 210/768, 769, 770, 771, 791, 159, 162, 350, 351, 354, 355, 356, 391, 394, 398, 402, 403, 407, 413, 416.1, 485, 808

[56] References Cited

U.S. PATENT DOCUMENTS

| | | | |
|---|---|---|---|
| 2,560,142 | 7/1951 | Tucker | 210/397 |
| 3,276,594 | 10/1966 | Gwilliam | 210/350 |
| 3,543,483 | 12/1970 | Sheehan | 210/407 X |
| 3,957,649 | 5/1976 | Hine | 210/407 X |
| 4,622,144 | 11/1986 | Janecek et al. | 210/351 |

Primary Examiner—Richard V. Fisher
Assistant Examiner—W. Gary Jones
Attorney, Agent, or Firm—Edward J. Brosius; Charles E. Bouton

[57] ABSTRACT

The present invention provides a liquid filtering apparatus wherein solids suspended in the liquid are accummlated to form a cake on the filter media as the liquid passes through the media. Upon the buildup of such solids, pressurization upon the liquid forces remaining liquid through the media. Such pressurization is inactivated upon excessive cake buildup, and a conduit helically wound about the outside of the filter media is expanded by air pressure. The conduit is attached at various points about its length so that it forms chord lines between such connection points. Such expansion and chording of the conduit breaks the cake from the media.

10 Claims, 4 Drawing Figures

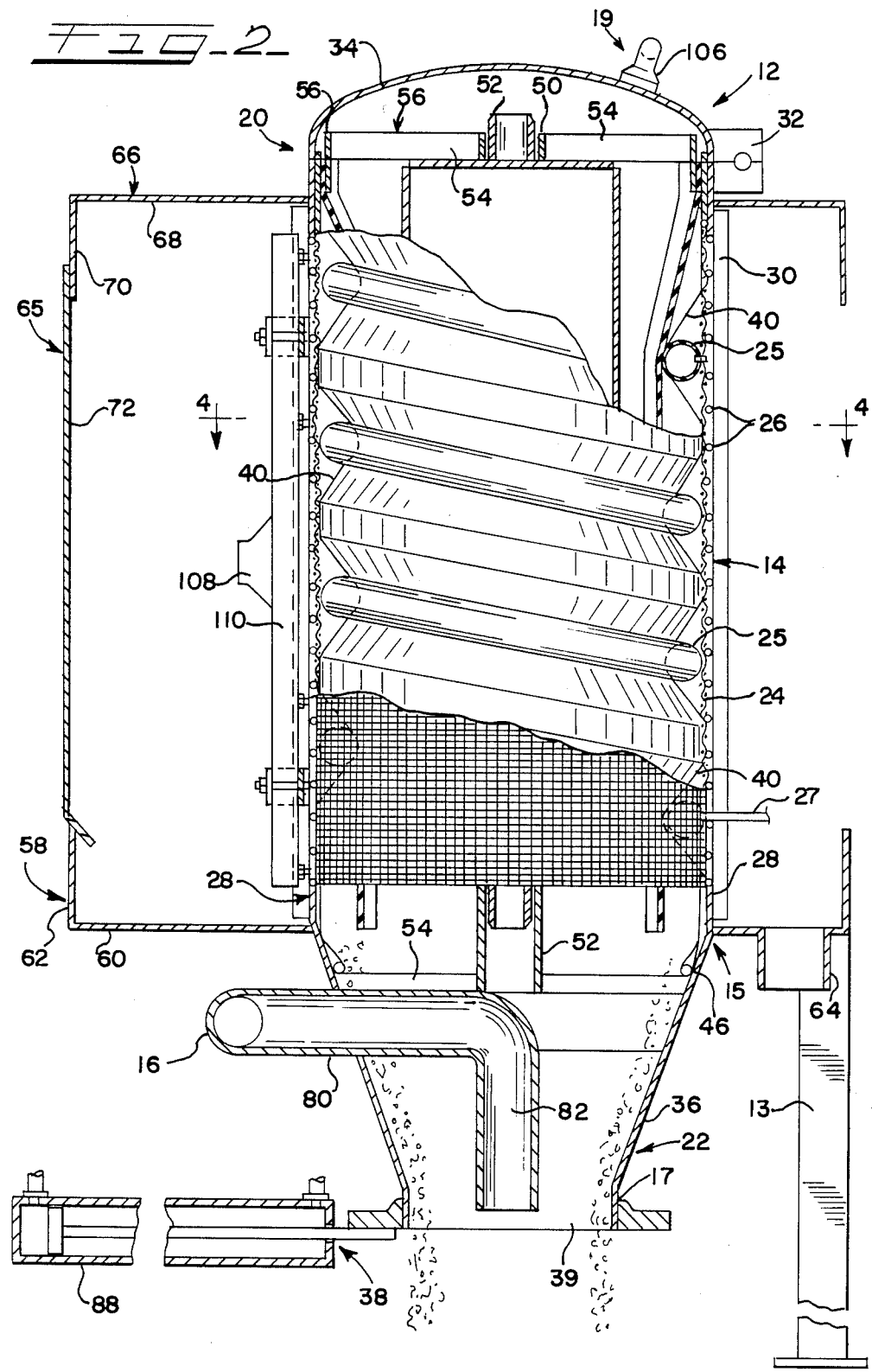

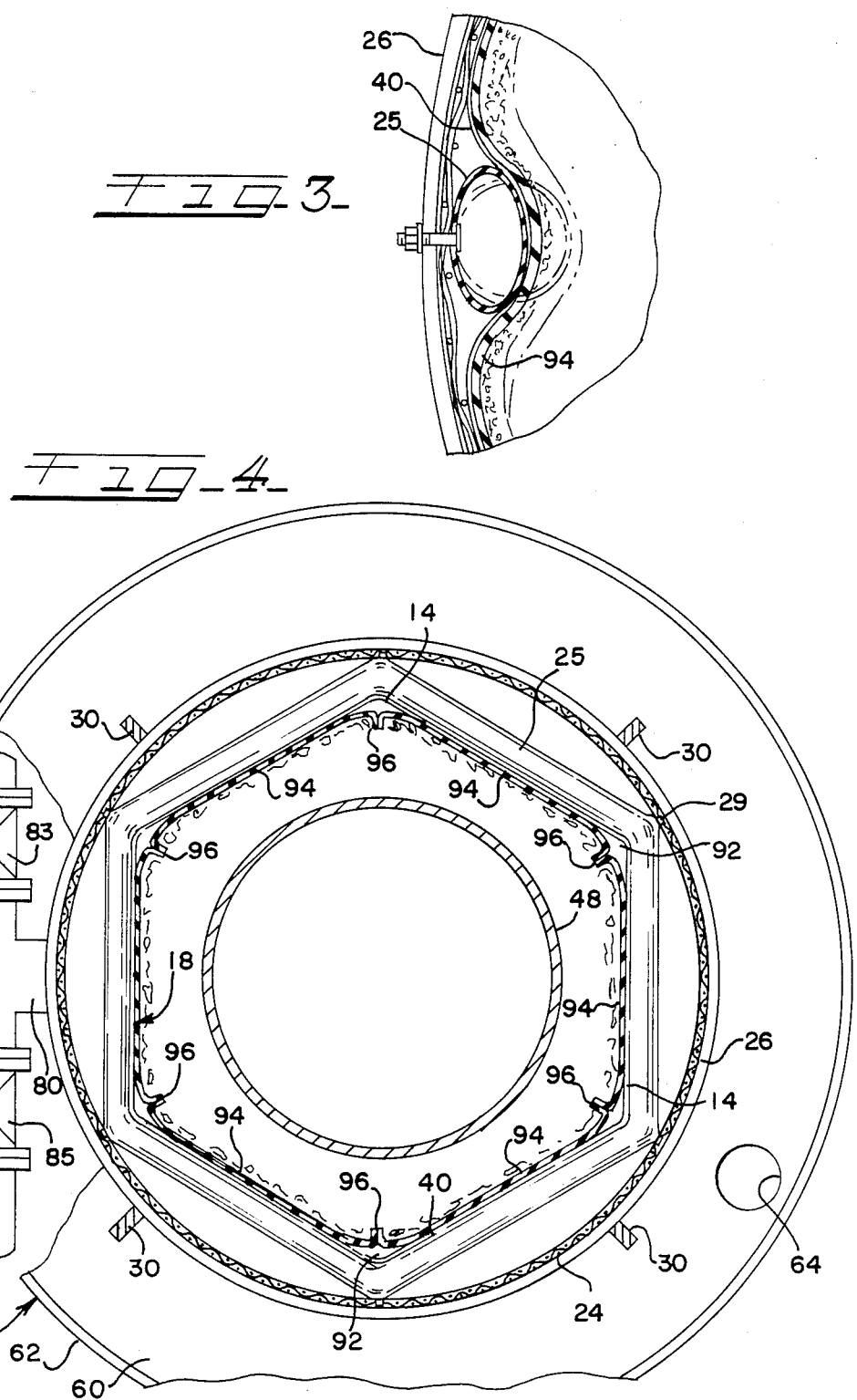

PRESSURE FILTER CAKE-BREAKING METHOD AND APPARATUS

BACKGROUND OF THE INVENTION

The present invention relates to a filtration method and filter apparatus for separating suspended solids from a liquid suspension and more particularly, to a filter apparatus constructed to break solids accumulated on the filter media away from the filter media.

The present invention is related to co-pending U.S. Pat. No. 4,622,144 and assigned to the assignee of the present invention.

In accordance with the present invention, it is proposed to provide a liquid suspension filtration apparatus for removing liquid from the suspended solids separated from liquid and deposited on a filter media together with apparatus for removing the solids deposited and caked on the filter media.

This is accomplished generally by introducing a liquid suspension into a pressure vessel having a filter wall section on which the solids are deposited. The vessel is filled so that the entire surface area of the filter section is covered. As the liquid flows through the filter wall section, the suspended solid is deposited and accumulated thereon with the filtrate passing therethrough. When the solids accumulated on the filter section are of such a thickness that further filtration is no longer feasible, flow of liquid into the vessel is discontinued and pneumatic pressure means are actuated to create a pneumatic pressure within the vessel. This causes further flow of liquid through the accumulated solids on the filter section and gradually displaces the liquid suspension from the filter section to expose increasing areas of accumulated solid to the pneumatic pressure. The pneumatic pressure acting on the exposed solids is operative to compress or squeeze the solids against the filter section and remove additional liquid therefrom to form a layer in the nature of a cake. When the excess liquid is displaced from the filter section, the remaining liquid suspension is removed from the vessel and the pneumatic pressure is released. A conduit device is provided between the filter section and the cake build up. In certain filtering applications, it is desirable to provide a fabric filter media over the filter screen section. In such cases, the conduit is placed between the filter media and the screen. The conduit is most typically wound to form a helical pattern around the filter section, and is held at various points throughout its length to the filter screen. When expanded by air pressure, the conduit changes configuration and forms chords between its connection points and thereby causes the expansion of the cake away from the screen. The cake falls through an outlet at the bottom of the vessel.

The above described arrangement is suitable for the extraction of liquids from suspended solids which are substantially air impervious when separated and deposited on the filter section. However, should the separated suspended solid not have the impervious characteristic, the arrangement of the present invention may be provided with a flexible fluid impervious curtain which overlies the filter section. The curtain is constructed and arranged so as to be spaced from the filter section to permit the passage of liquid through the latter. Upon the application of the pneumatic pressure to gradually displace the liquid from the filter section, the flexible curtain is forced into face to face engagement with the solids accumulated on the filter section by the pneumatic pressure acting thereon to compress the solids and extract liquid therefrom in substantially the same manner as described above.

DESCRIPTION OF THE DRAWINGS

In the drawings

FIG. 2 is an elevational view similar to FIG. 1 but showing the components in a position for breaking the filter cake away from the filter media;

FIG. 3 is a horizontal fragmentary cross section through the upright wall of the filter apparatus and showing in particular the conduit for dislodging suspended matter cake; and FIG. 4 is a fragmentary cross sectional view taken generally along the lines 4—4 of FIG. 2.

DESCRIPTION OF THE INVENTION

Figure 1:
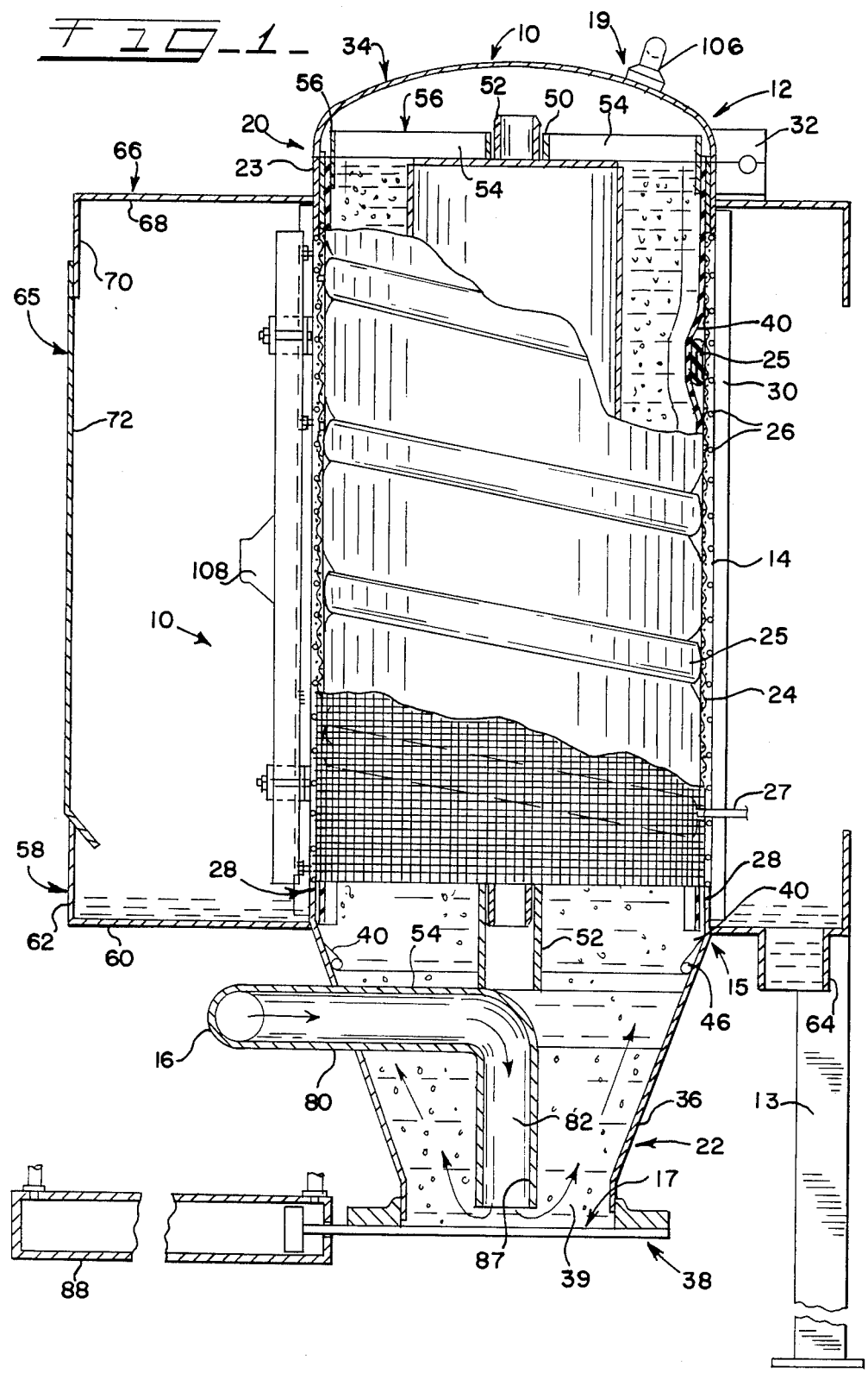
FIG. 1 is an elevational view partially in cross section of a filter apparatus embodying the structure of the present invention and showing the components thereof in an operating and filtering position.

Referring to the drawings there is shown a filter apparatus 10 embodying the structure of the present invention. The filter apparatus comprises generally a vessel 12 having a porous filter section 14, a fluid inlet means 16 for introducing a liquid suspension into the vessel, a fluid impervious curtain 18 for compressing suspended solids S accumulated on the surface of the filter section 14, and pneumatic pressure means 19 for applying pressure forces on the liquid and to compress the solids against the filter section 14. The vessel 12 may be supported on suitable framing 13.

In the form shown, the vessel 12 is of generally cylindrical shape including an upstanding wall section 15 constructed to provide an outlet 17 for the suspended matter of the liquid suspension being filtered, a top section 20 and a bottom section 22. The vessel is constructed to withstand the higher than atmospheric pressures to which the vessel 12 is subjected during use as more fully explained hereinafter.

The wall section 15 includes an upper cylindrical end 23 having attached thereto filter section 14. As shown, filter section 14 includes a wire screen 24 which may be of a larger mesh than that required to perform the filtering function. The wire screen is attached to the end 23. A spiral wound rod 26 is fixed to the cylindrical upper end 23 and to lower cylindrical section 28. Fixed to the spiral rod 26 are a plurality of angularly spaced upright reinforcing bars 30 fixed also to the upper and lower cylindrical sections 23 and 28.

Dome cover 34 is attached to the upper cylindrical end 23 by means of hinge 32. The mating edges of the cover 34 and cylindrical end 23 may be sealed by a suitable sealing gasket (not shown).

The bottom or outlet section 22 may be in the shape of an inverted truncated cone 36 welded to the lower cylindrical section 28. A closure assembly such as a slide valve 38 is fixed to the cone 36 to selectively open and close the outlet or opening 17 through which the substantially liquid free solid or cake is discharged as more fully to be described hereinafter. The valve assembly 38 may be of conventional two-way solenoid or pneumatic two-way construction so that valve 38 is movable between as open (FIG. 2) and closed (FIG. 1) position over the opening 17.

In the embodiment shown, the filter section 14 includes a filter media sleeve 40 disposed along the interior of the vessel 12 to overlie the wire screen 24. It is to be understood, however, that in some applications of the filter apparatus 10, such media may not be used, but rather the mesh of the screen or the wall structure may be so modified that a separate filter media is not required. As shown, the filter media 40 is in the form of a tubular sleeve made from a porous material either woven or nonwoven. Such filter materials are well known in the art.

As shown in FIG. 1, a conduit 25 is provided between wire screen 24 and woven filter media sleeve 40. Media sleeve 40 is generally cylindrical and is typically flush against the inner surface of wire screen 24. Conduit 25 comprises a woven fabric hose or similar device which, when evacuated of air, is flattened between media sleeve 40 and wire screen 24 taking up very little radial space and enabling media sleeve 40 to nearly abut wire screen 24 in the area of flattened conduit 25. It is desirable for the conduit to be as small of a diameter as possible to accomplish the cake breaking function to be described below. Further, note that conduit 25 is helically wound about wire screen 24 in order to pass around a major portion of filter section 14. Typically, the spacing between each helical pass should be about one foot (30 cm).

As best shown in FIG. 3, conduit 25 is connected at various points along its outer edge to wire screen 24. Such connection typically comprises bolting as shown at 29. When compressed air at about 100 psi (7 kg/cm$^2$) is injected into conduit 25 through air inlet 27, conduit 25 expands to the configuration shown in FIGS. 2 and 4, both expanding the conduit from a flattened cross section to a fully rounded or expanded cross section and also causing conduit 25 to chord between connection points 29. Such chording between connection points causes filter media 40 (when present) and the filter cake built up thereon to move away from the position adjacent the wire screen 24 to the chord position. Such substantial movement of the filter cake causes the cake to break up and to fall downwardly into lower cylindrical vessel section 28. This breaking of the filter cake is especially complete and uniform due to the helical winding of conduit 25 around the inner surface of wire screen 24.

The source of compressed air (not shown) to inlet 27 can be reversed to draw a partial vacuum through conduit 25. This action is desired upon completion of the cake being broken away from media 40 and dropping through slide valve 38. Upon such partial vacuum being drawn through conduit 25, the woven hose or similar element comprising conduit 25 will be collapsed to the nearly flat cross section configuration shown in FIG. 1. Upon the inletting of liquid to be filtered through inlet 16 and the improved flow of such liquid, filter media 40 will be again forced against wire screen 24 with very little spacing between filter media 40 and wire screen 24 being taken by collapsed conduit or hose 25.

The capacity of the vessel 12 may be decreased by a hollow sealed drum 48 to reduce the volume of pressurized air which is subsequently charged into the vessel as more fully to be explained hereafter. The drum 48 is coaxially disposed within the vessel by means of cylindrical shafts 50 fixed to the upper and lower ends thereof. The cylindrical shafts 50 seat within complementary open ended cylindrical supports or bosses 52.

The cylindrical bosses 52 are fixed to a circular strap 54 by means of radial legs 55 to form spiders 56. The upper one of the spiders 56 is seated on a hoop 57 and the lower spider 56 is removably seated in the truncated cone section 36. In this manner both the drum 48 and its associated spider support 56 may be removed from the vessel.

A trough 58 for collecting the filtrate is disposed about the exterior of the lower section of the vessel 12. The trough 58 is defined by an annular base 60 and an upstanding flange 62. A filtrate outlet 64 is provided in the annular base 60.

A filtrate or trough cover structure 65 is disposed about the filter section 14 and includes an annular hood 66 defined by an annular top panel 68 and a downwardly depending flange 70. Disposed between the depending flange 70 and the upstanding flange 62 is a removable side wall panel 72 which permits access to the filter section 14.

Inlet pipe 80 opening 82 is directed downwardly toward the slide of a closure member such as a valve 38 which is movable between a normal closed position across the base opening 17 as shown in FIG. 1 and an open position as shown in FIG. 2. The slide valve 38 is actuated by a fluid actuated cylinder 88 connected to a suitable source of pressurized fluid.

Curtain 18 is loosely suspended from its upper end within the vessel 14 and has its lower end spaced from the side wall so as to provide an annular chamber 92 contiguous with the filter section into which the liquid suspension flows. Curtain 18 is made from a flexible fluid impervious material such as rubber or plastic. Curtain 18 may be a unitary structure formed as by molding or may be fabricated from a plurality of sheets.

As shown in FIG. 4, the curtain 18 is in the form of a tubular sleeve comprising a plurality of panels or sections 94 which are bonded together along adjacent edges as by adhesive vulcanizing, or heat sealing or the like to form inwardly extending radial seams 96. The sum of the widths of the panels 94 is such as to snugly conform with the inner circumference of the vessel 12 at the filter section 14. Upon filling the vessel 12, the seams 96, which tend to impart lengthwise rigidity to the curtain, cause the panels 94 to be irregularly spaced inwardly away from the surface of the filter section 14 as shown in FIG. 4. In this manner, the major portion of the liquid suspension in the vessel is directed into a chamber 92 defined between the filter section 14 and curtain 18 for passage through the filter section 14.

The pneumatic pressure means 19 located on the upper section 20 includes compressed air nozzle 106 mounted on the cover 34. The nozzle 106 is connected by piping to a suitable source of compressed air (not shown). The compressed air source may be of the type conventionally used in manufacturing facilities and which is capable of delivering the desired pressure and volume. Typically such conventional types of air compresser delivers about 100 psi.

Shown in FIGS. 1 and 2, blow-off means 108 connected to a suitable source of pressurized air are mounted on radially spaced supports 110 fixed to the upper and lower sections of the vessel 12. The blow-off means 108 are operative to assist in the removal of the accumulated solids cake on the filter section after the breaking of the cake by the expansion of conduit 25.

In operation, liquid suspension to be filtered is continuously introduced into the vessel whereupon the suspension is filtered through the filter section 14 and the solids are accumulated thereon. Assuming the materials to be filtered out are air impervious or form such a cake, curtain 18 is not needed and can be removed. The filtrate drops into the trough 60 from which it flows through the outlet 64 for disposal or recovery. The solid is accumulated on the filter section 14 and as the thickness of the solid accumulates, the resistance to flow therethrough increases so that the suspension fills the vessel and the pressure increases until the pressure, as detected by a pressure sensitive detector (not shown), is at a predetermined set point. Further flow into the vessel is cut off by valve closure of the tank inlet 16.

The compressed air nozzles 106 are then opened to maintain the vessel charged with a pneumatic or air pressure higher than the above set point. This causes the liquid to continue to flow through the accumulated layer of solids on the filter section 14. As a result, the liquid level within the vessel drops so that the pressure compresses the solids that are exposed above the upper liquid level against the filter media 40 to further extract liquid therefrom. At the same time, the pneumatic pressure blowing therethrough the exposed solids serves also to create a drying effect on the accumulated solids. In this manner the accumulated solids are formed into a substantially liquid-free cake on the filter surface.

When the liquid level drops below the filter section 14, the remaining liquid suspension from the vessel is withdrawn through an inlet 82 for return to the liquid suspension carrying tank. The slide valve 38 is then opened. The cake solids are then broken by the pressurization and expansion of conduit 25 and jets 108. The separated cake drops through the opening 39 into a hopper. To resume operation after the cake is removed, conduit 25 is evacuated to collapse to a flat condition shown in FIG. 1, the slide valve 38 is closed and an intake valve (not shown) opened so that the pump again feeds liquid suspension into the vessel for further filtration.

In the event that the suspended solid is not capable of providing substantial resistance to the flow of fluid through the filter section 14, the curtain 18 is installed prior to introducing the suspension. The liquid suspension is pumped into the vessel over the filter section 14 so that it may be filtered through the latter as shown in FIG. 1. The suspended solid accumulates on the filter media 40 of the filter section 14 and the filtrate is collected in the trough 60 in the same manner as previously described. When the filtration pressure is at the set point or after a timed interval, the inlet valve is closed to shut off flow from the tank. The pneumatic means 106 are actuated to cause continued flow through the filter section and as the liquid level progressively drops, as heretofore described, the pneumatic forces are operative to cause pressure to be exerted on the exposed surface of the curtain above the liquid so that further liquid is squeezed from the accumulated layer of solids until the liquid level drops below the lower edge of the curtain.

At this time the compressed air flows upwardly into the space 92 occupied by the accumulated layer so that the air pressure within the chamber is released and the nozzles 106 may be closed. The outlet valve is opened and the remaining liquid suspension in the vessel removed through the pipe 82 to return the suspension back to the tank.

After the liquid suspension is removed, the slide valve 38 is opened for discharge of the cake. Expansion and chording of conduit 25 acts to break apart the cake as described above. Upon activation of the pneumatic nozzle 108, the curtain panels 94 tend to flex irregularly away from the filter section causing the cakes to separate and be discharged through the opening 39 as shown in FIG. 2.

What is claimed is:

1. A method of filtering comprising the steps of
   providing a vessel adapted to receive a liquid to be filtered,
   providing an inlet for the liquid to be filtered near the bottom of the vessel,
   providing a mesh screen so as to form an internal wall in the vessel,
   providing a filter media overlaying the inner side of the mesh screen,
   inletting liquid to be filtered into the vessel such that the liquid passes through the filter media and mesh screen,
   introducing pressurized air into said vessel in contact with the top of the liquid being filtered to force the liquid through the filter media and mesh screen,
   ceasing the inletting of liquid to be filtered after a caking buildup of materials filtered from the liquid has occurred on the inner surface of the filter media, and
   expanding a conduit helically wound between the filter media and the mesh screen to thereby break away the buildup of filtered materials from the filter media.

2. The method of filtering of claim 1 wherein the conduit comprises a fabric hose that is connected to the mesh screen at various points throughout its helical path such that, upon expansion of the conduit by compressed air, the conduit forms chord lines extending from the various points of connection to the mesh screen.

3. The method of filtering of claim 2 wherein, upon completion of the expansion of the conduit and the breaking away of the buildup of filtered materials from the filter media, the conduit is contracted by evacuation of the compressed air to its non-expanded, nearly flat shape so as to permit the filter media to contact the mesh screen along nearly the entire length of the filter media once liquid to be filtered is again inlet into the vessel and begins passing through the filter media and mesh screen.

4. A filter apparatus comprising
   a vessel having an inlet for receiving liquid to be filtered,
   a mesh screen around the outer circumference of said vessel and a filter media on the inner side of said mesh screen such that said liquid to be filtered flows through said media and said mesh screen,
   and an expandable conduit located between said mesh screen and said filter media, said conduit wound in a generally helical path around said mesh screen and held at various points along its length to adjacent points on said mesh screen, such that upon expansion of said conduit after a buildup of materials removed from said liquid to be filtered onto said filter media and the flow of liquid to be filtered has substantially ceased through said filter media and said mesh screen, a substantial portion of said filter media will be moved away from said mesh screen such that substantially all of said buildup of filtered materials is broken away from said filter media and falls from said filter media.

5. The filter apparatus of claim 4 wherein said conduit comprises means for forming chord lines extending from the points on the mesh screen on which the conduit is held, thereby moving said filter media away from said mesh screen in general alignment with said chord lines.

6. The filter apparatus of claim 4 wherein an air pressure source is provided whereby said conduit is expanded by air pressure.

7. The filter apparatus of claim 4 wherein said mesh screen and filter media form a generally cylindrical wall of said vessel.

8. The filter apparatus of claim 4 wherein said conduit is deflatable to a nearly flat configuration between said mesh screen and said filter media.

9. The filter apparatus of claim 8 wherein said conduit comprises a flexible hose, and wherein an air pressure source is provided which is further capable of evacuating said hose to deflate it to a nearly flat configuration.

10. The filter apparatus of claim 4 further comprising an impermeable curtain of a shape generally corresponding to said filter media and a source of air pressure above said liquid to be filtered acting on said liquid to force said liquid through said filter media and mesh screen and, upon the cessation of flow of liquid to be filtered into said vessel, said curtain is compressed by said air pressure against said buildup of materials on said filter media so as to force substantially all of the liquid from said buildup through said filter media.

* * * * *